United States Patent [19]

Hopkins et al.

[11] 3,710,278
[45] Jan. 9, 1973

[54] CALCIUM-YTTRIUM SILICATE OXYAPATITE LASERS

[75] Inventors: Richard H. Hopkins; George W. Roland, both of Monroeville; William D. Partlow, Blackridge; Kenneth B. Steinbruegge, Murrysville, all of Pa.

[73] Assignee: Westinghouse Electric Corporation, Pittsburgh, Pa.

[22] Filed: June 21, 1971

[21] Appl. No.: 154,982

Related U.S. Application Data

[62] Division of Ser. No. 859,672, Sept. 22, 1969.

[52] U.S. Cl..................................331/94.5, 330/4.3
[51] Int. Cl.............................................H01s 3/16
[58] Field of Search.....331/94.5; 252/301.4; 330/4.3

[56] References Cited

UNITED STATES PATENTS 3,504,300  3/1970  Mazelsky et al.....................331/94.5
3,617,937  11/1971  Mazelsky et al.....................331/94.5

Primary Examiner—William L. Sikes
Attorney—F. Shapoe et al.

[57] ABSTRACT

A composition of matter which can be used as a laser crystal in a laser generator and which can be doped with sensitizer ions has the empirical chemical formula $CaY_{4-x}(SiO_4)_3O:A_x$, where A represents a lasing ion selected from Nd and Er and $x$ has a value from 0.001 to 1.

10 Claims, 5 Drawing Figures

CALCIUM-YTTRIUM SILICATE OXYAPATITE LASERS

CROSS REFERENCE TO RELATED APPLICATIONS

This application is a divisional application of application U.S. Ser. No. 859,672 filed on Sept. 22, 1969.

BACKGROUND OF THE INVENTION

Energy transfer from one fluorescent specie to another or among fluorescent species of the same kind, is a fundamental process in luminescence. Before the advent of lasers, energy transfer was widely utilized in commercial phosphors, such as those used in fluorescent lamps to improve their efficiency, and was extensively studied in connection with organic phosphors.

With the advent of lasers, energy transfer processes have taken on additional importance as a means for improving the efficiency of optically pumped lasers. The work on fluorescent lamps was concerned mainly with the transfer of energy between transition metal ions of different types. In contrast, investigations on laser materials have been principally concerned with energy transfer from transition metal ions to rare-earth ions, or energy transfer from rare-earth to rare-earth ions.

The basic aim of laser energy transfer can be described as follows: given an ion which has desirable spectroscopic properties (i.e., it emits in a desirable frequency region with a suitable bandwidth etc.), but which is only a weak or inefficient absorber of the excitation energy, one must find another ion, which has desirable absorption properties and which can transfer its energy efficiently and rapidly to the emitting ion. The emitting ion is called the activator or lasing ion and the absorbing ion is called the sensitizer. Energy transfer occurs from the sensitizer to the activator ion.

It has been demonstrated in U.S. Ser. No. 732,593, filed on May 28, 1968, and assigned to the assignee of this invention, that the mineral fluorapatite, $Ca_5(PO_4)F$, is an excellent hose for sensitizer and/or activator ions. Suitably doped fluorapatite exhibits high gain and low threshold characteristics. Large single crystals of this doped material are prepared by Czochralski growth from stoichiometric melts at temperatures of about 1,650°C.

Our invention relates to a composition of matter suitable as a laser crystal in a resonant cavity of a laser generator. Our laser materials are based on silicate oxyapatite hosts doped with neodymium or erbium. Within the limits of our measurements, these materials melt congruently. They melt at considerably higher temperatures (about 2,100°C) than fluorapatite and exhibit a higher material strength. Although the existence and synthesis of some silicate oxyapatite powders generally has been disclosed, as for example by Jun Ito in 53 American Mineralogist 890; growth, doping and laser application of large single crystals of our materials has not been previously considered.

In addition to the crystalline laser materials of this invention, other related crystalline laser materials are described in Patent applications U.S. Ser. No. 859,673, U.S. Ser. No. 859,754 and U.S. Ser. No. 859,753 all filed on Sept. 22, 1969 and assigned to the assignee of this invention.

SUMMARY OF THE INVENTION

It is the prime object of this invention to provide a new and improved high strength composition of matter for use as a laser crystal in the resonant cavity of a laser generator.

This invention accomplishes the foregoing object by providing a silicate oxyapatite laser crystalline material having the empirical formula:

$CaY_{4-x-y}(SiO_4)_3O:A_x,S_y$ where A represents an activator ion (lasting ion) that is responsible for laser output. A, the activator ion, is selected from Nd or Er A, which ion is the lasing ion, in the crystal can be determined by measuring the frequency of the laser oscillations and from known spectrographic data. Generally only one lasing ion will oscillate at a time. S represents a sensitizer ion which need not be present in the crystal. The sensitizer ion must be matched to the lasing ion. The value $x$ can vary between 0.001–1 with a preferred range between 0.001–0.3 and $y$ can vary between 0 to $(4-x)$ with a preferred range between 0 to 1.0. Y, yttrium, is considered a host constituent and the prime constituent for which activator and sensitizer ions are substituted.

These materials have low threshold characteristics and low gain allowing improved energy storage. They also have high material strength. These materials provide a laser crystal capable of withstanding without structural distortion, significantly higher pumping energies than fluorapatite. Little segregation is observed in doping with neodymium and erbium. This reduces serious crystal problems which exist in most hosts due to variation in dopant segregation along the crystal caused by temperature fluctuations during growth.

BRIEF DESCRIPTION OF THE DRAWINGS

For a better understanding of the nature and objects of the invention, reference may be made to the following drawings in which.

DESCRIPTION OF THE PREFERRED EMBODIMENTS

The silicate oxyapatite host material of this invention has the formula $CaY_4(SiO_4)_3O$. This host contains ion sites which will accommodate both rare earth and transition metal ions. The crystal structure of $CaY_4(SiO_4)_3O$, where Y is a host constituent, is hexagonal with a unit cell formula of $Ca_2Y_8(SiO_4)_6O_2$. This host material has an apatite structure (space group $P6_3/n$). The $Si^{+4}$ ions are in $SiO_4$ tetrahedra. Two sets of $O^{-2}$ ions are present. One set is co-ordinated with $Si^{+4}$ in the $SiO_4$ tetrahedra and the other set occurs along the c axis (two ions per unit cell) with each ion co-ordinated by three cations (calcium or yttrium) in the plane of the horizontal mirror in $P6_3/m$. Two types of cations sites are present ($Ca_I$ or $Y_I$ and $Ca_{II}$ or $Y_{II}$). The activator ions and/or transition metal or rare earth sensitizer ions can substitute for Y and Ca in the host material. This will be a substitution of some of the five Ca and Y cations in the host $CaY_4(SiO_4)_3O$.

The host materials of this invention use the rare earth ions $Nd^{+3}$ or $Er^{+3}$ as their activator (lasing) ion. The ion concentration of these activators can vary in the host from about 0.020 to 20 atom percent of the five cations (one Ca and four Y cations) in the host $CaY_4(SiO_4)_3O$. The preferred range of activator is from about 0.02 to 6 atom percent. Below the preferred range there is generally not enough optical absorption and above the preferred range there may be concentration quenching. Thus, x has a preferred value between 0.001 and 0.3, i.e., $(0.001 = x)/5$ cations equals 0.020 atom percent and $(0.3 = x)/5$ cations equals 6 atom percent. However with improved flash sources for special applications it is useful to have the value of x greater than 0.3. The sensitizer ion S has a preferred range for y from 0 to 1, i.e., the ion concentration of S preferably varies from about 0 to 20 atom percent $(1 = y/5)$ of the five cations in the host.

Figure 1:
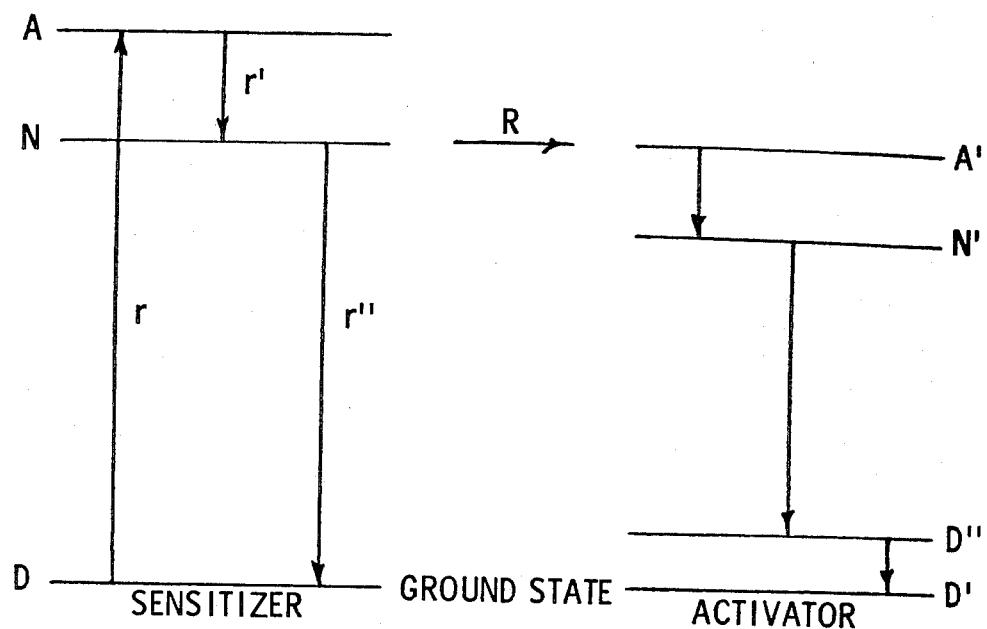
FIG. 1 shows energy levels of sensitizer and activator ions indicating transitions pertinent to energy transfer.

In accordance with this invention sensitizer ions may be used to sensitize the rare earth activator ions $Nd^{+3}$ or $Er^{+3}$. Referring now to FIG. 1 which illustrates the various steps involved in non-radiative energy transfer: (1) The sensitizer ion absorbs a photon of external radiation of energy r, lifting it from the sensitizer ground state D to an excited state A. (2) The sensitizer subsequently decays to a lower metastable state N, by the emission of a photon r' or by a non-radiative process. (3) Once lattice relaxation about the sensitizer metastable state has taken place, the sensitizer is either free to radiate a photon r'' or to transfer its energy to an activator ion, as indicated by R. (4) If the electronic transitions in both the sensitizer and activator are electric dipole transitions, the dipole field of the excited sensitizer can introduce a dipole transition in a nearby activator, thereby raising the activator to an excited state A', with a simultaneous return of the sensitizer to its ground state. (5) This transition transfers a quantum of energy from the sensitizer to the activator. Once excited, the activator can decay to a lower metastable level N', through emission of photons, and can eventually decay to its ground state D' either directly or via an intermediate level D''. Reference may be made to D. L. Dexter, J. Chem. Phys., Vol. 21, 1953, page 836 for detailed description of these energy transfer processes.

The requirements in non-radiative transfer for efficient transfer of energy from sensitizer to activator are: (1) A reasonable overlap in energy between the sensitizer emission band and an absorption band of the activator. (2) High oscillator strengths in both sensitizer and activator. (3) A relatively high intrinsic radiative quantum efficiency for both the sensitizer and activator. In addition to the above criteria, there are several other criteria of a more general nature for a useful sensitizer. These are: (1) The sensitizer should absorb radiation in a spectral region where the activator has little or no absorption, (2) the sensitizer should absorb in a region where the pump lamp radiates appreciable energy, and (3) the sensitizer should not absorb where the activator emits, or have any adverse affects on the radiative efficiency of the activator. For efficient energy transfer to occur it is necessary that the rate of transfer (R in FIG. 1) be more rapid than the rate of decay of the sensitizer to its ground state (r'' in FIG. 1).

The sensitizing ions that may be used in the composition of this invention would include transition metal and rare earth ions, which are capable of (a) absorbing radiation energy otherwise not absorbed by the activator (lasing ion) and (b) transferring that absorbed energy to the activator.

Although a variety of transition metal ions and rare earth ions are suitable to sensitize the activator ions in the host laser crystal, best results are achieved when selected sensitizer ions are matched to activator ions in the host. The following table shows some suitable combinations:

TABLE 1

| Host | Activator Ion | Suitable Sensitizer Ions |
|---|---|---|
| $CaY_4(SiO_4)_3O$ | $Nd^{+3}$ | $Mn^{+2}$ |
| | $Er^{+3}$ | $Yb^{+3}$ |

In the preparation of the laser crystalline material of this invention, 19.6863 grams of $CaCO_3$, 86.6187 grams of $Y_2O_3$, 3.3098 grams of $Nd_2O_3$ and 40.3853 grams of silicic acid were mixed together. All reactants were of luminescent grade (greater than 99.9 percent purity). The ingredients were then placed in an iridium crucible and melted at approximately 2,090°C as measured by an uncorrected optical pyrometer.

Crystals were pulled from the melt at 2,090°C using the standard Czochralski technique, well known in the art and described in an article by J. Czochralski in *Zeitschrift fuer Physikalische Chemie*, Vol. 92, pages 219-221 (1918). A recent description of the process is found in an article by H. Nassau and L. G. Van Uitert in *Journal of Applied Physics*, Vol. 31, page 1,508 (1960).

The furnace was surrounded by a quartz cylinder attached to the apparatus by means of a neoprene gasket and a brass flange. Insulation for the iridium crucible was provided by one-half inch thick zirconia quadrants stacked into a cylinder. Thermal distribution throughout the melt was controlled by adjusting the crucible in the field of the work coil and by changing spacing of the zirconia quadrants and the top plate. The power source was a Westinghouse 30 KVA motor-driven 10,000 cycle generator with a water cooled copper work coil. The pulling apparatus was designed such that pull rates between 1 and 40 mm./hr and rotation speeds of 10–70 rpm could be used. Temperature was controlled by using the output of a sapphire light pipe leading to a radiamatic detector which fed the output into an L and N Azar recorder-controller. The voltage from the recorder-controller in association with an L and N current adjusting type relay supplied the input current of a Norbatrol linear power controller. The Norbatrol output voltage supplies the necessary field excitation required by the 10,000 cycle generator.

The seed was held on a water cooled shaft which was threaded to be accommodated in iridium chuck. The crucible and chuck were protected from oxidation by an argon atmosphere. Oriented seeds were used for growth. These were obtained by starting with a polycrystalline seed obtained from a slow-cooled melt. Crystals were grown as large as one-quarter inch in diameter and 1 inch long. Cooling rates of the pulled crystals varied from 2 to 6 hours.

The crystalline materials grown and containing Nd or Er lasing ions are useful as laser crystal rods in simple lasers and in more complicated laser applications such as Q switched lasers, both of which are described in detail in chapters 3 and 4 and especially pages 132–160 of The Laser by W. V. Smith and P. P. Sorokin, McGraw Hill, 1966, herein incorporated by reference.

Figure 2:
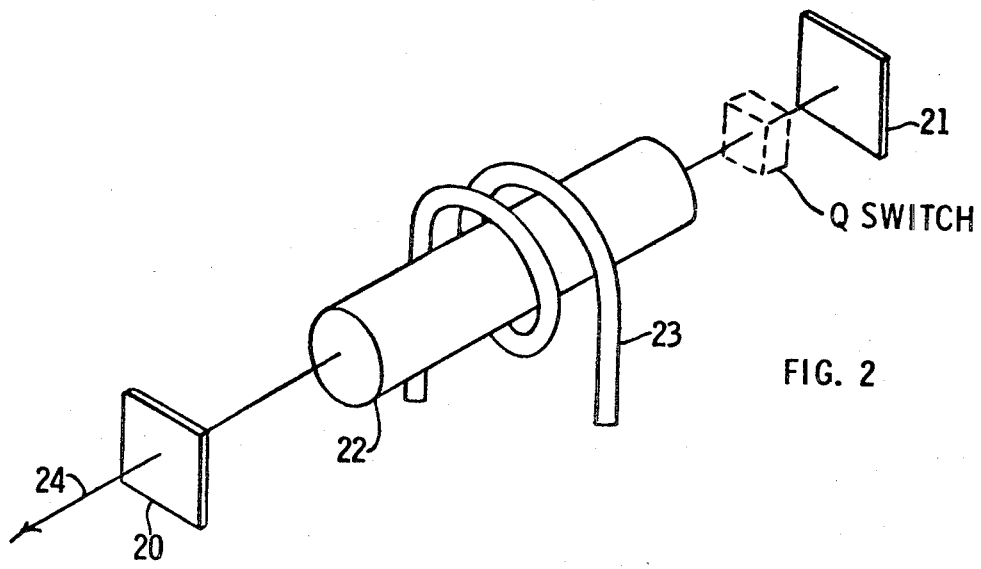
FIG. 2 shows a laser generator utilizing the laser crystal of this invention in association with a radiation source in a resonant laser cavity.

A simple schematic illustration of a typical laser generator is shown in FIG. 2 of the drawings. Between reflectors 20 and 21 there is a resonant laser cavity containing the laser crystal 22, a radiation source means 23 such as a flash lamp which provides pump energy to the crystal, and possibly a Q switching means shown by dotted lines. Reflector 20 is partially reflecting to permit the escape of light beams of coherent radiation 24 whereas reflector 21 is highly reflective.

The basic principle involved in Q switching a laser is to allow a very high population inversion to be built up by making the laser cavity losses excessive while the laser is being pumped, thereby preventing the laser from oscillating prematurely. When a strong inversion is attained, the conditions are suddenly made favorable for oscillation by rapidly making the cavity losses very small, so that a condition of large net amplification is suddenly realized. The Q switch could, for example, contain a metallo-organic compound in solution such as a phthalocyanine which absorbs light from the crystal. The pumping energy input from the flash lamp increases until amplification in the laser crystal overcomes the loss due to absorption in the Q switch cell and the laser begins to emit coherent light weakly. A very small amount of this light bleaches the solution which then becomes almost perfectly transparent to the light. At that instant there is suddenly a giant pulse of light containing all the stored energy in the laser rod.

One of the crystals pulled at a rate of one-quarter inch per hour from a melt at about 2,090°C showed laser action at a 1.06 micron wavelength. The crystal composition was $CaY_{3.9}Nd_{0.1}(SiO_4)_3O$. This grown boule was ground and polished. The finishing procedure on the rod end resulted in polished ends parallel to better than 6 arc seconds and plane to one-tenth wavelength of He light. It was in the form of a 0.205 inch diameter, 0.938 inch long circular rod. It was tested in a 2.7 inches cylindrical reflecting cavity.

The laser head used in all pulse tests was a cylindrical pyrex reflecting cylinder 75 mm in diameter and 76 mm long having two reflecting pyrex end plates with holes machined for the lamp and rod. Front surface evaporated aluminum coatings were used and overcoated with λ/10 quartz for protection. Resonator reflectivities were both 99.2 percent. The output resonator was optically flat, the other resonator had a one meter curvature. A PEK Xel-3 Xenon flashlamp was located diametrically opposite the laser rod with a center to center spacing between the lamp and rod of 0.6 inches. This flashlamp was a broad band emitter with a peak emission around 5,800 A. The laser rod was supported in a double-wall pyrex cylinder filled with a water filter solution of $NaNO_2$ to prevent UV from reaching the laser rod being tested. The flashlamp was powered by a charged 340μF capacitor which was discharged through a 150μh inductor in series with the lamp. The maximum energy into the flashlamp was held below 100 joules to insure long life. The RLC circuit described produced a flashlamp pulse duration of about 800μseconds.

Although the operating characteristics of lasers are determined by the properties of their active lasing ions, the actual results achieved in any given system is highly dependent on imperfections in the crystal. Microscopic imperfections invisible to the eye may make laser oscillation impractical. The presence of bubbles or inclusions may scatter the beam and increase threshold significantly.

Despite the small rod size of the $CaY_{3.9}Nd_{0.1}(SiO_4)_3O$ crystal and its poor optical quality, room temperature laser action was obtained at the threshold of approximately 50 joules. With larger, high-quality crystals, threshold values of 5 joules should be possible.

Measurements of the laser threshold were accomplished by aligning the laser rod in the laser head in the usual way with external reflectors. A 1P25 phototube was then placed in the path of the beam with a 1.06 micron interference filter between the laser and phototube to reduce the background signal. The phototube output was displayed on a Tektronix type 555 dual-beam oscilloscope with one trace serving as an expanded scale. Thresholds could be accurately determined since the onset of lasing action appears as characteristic spikes as seen with other materials such as ruby.

Figure 4:
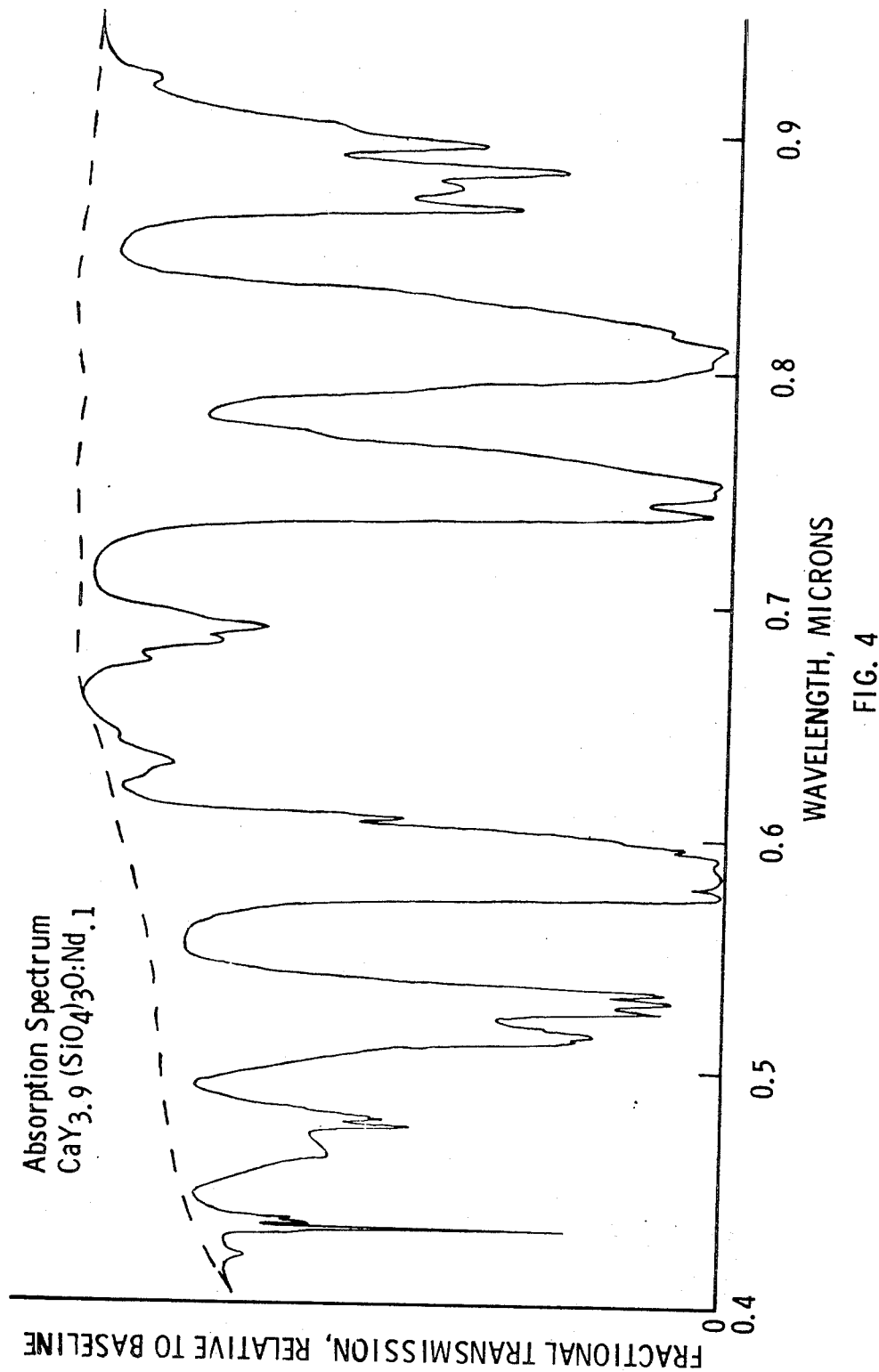
FIG. 4 shows the absorption spectrum of a single crystal of $CaY_{3.9}Nd_{0.1}(SiO_4)_3O$, beam perpendicular to the $c$ axis of the crystal and through a thickness of 0.2 inches.
Figure 3:
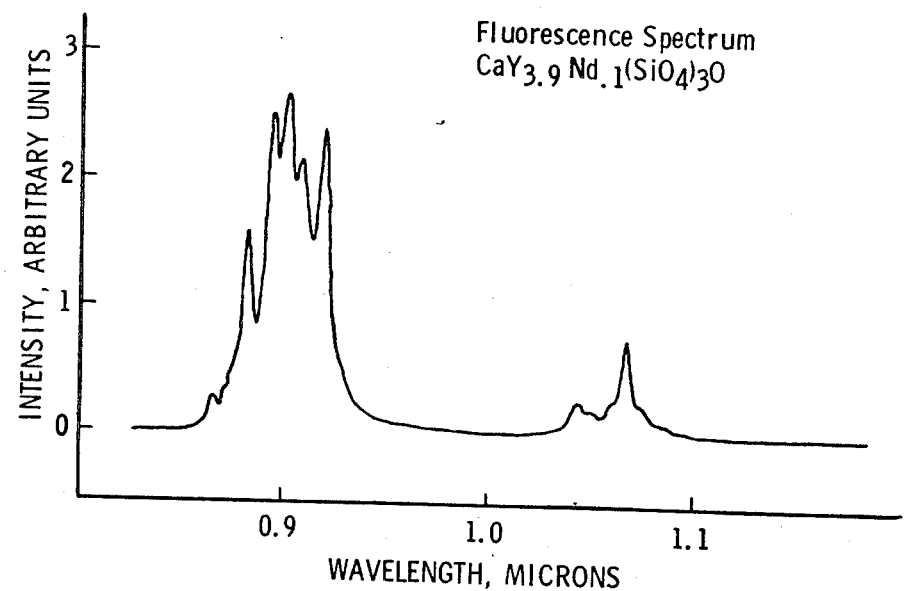
FIG. 3 shows the fluorescence spectrum of a polycrystalline sample of $CaY_{3.9}Nd_{0.1}(SiO_4)_3O$. This figure is uncorrected for spectral transmission of the spectrometer and detector sensitivity. The uncorrected spectrometer caused the 1.06 micron group to appear relatively weaker than it should be.

Spectroscopic data on the fluorescence and absorption of $CaY_{3.9}Nd_{0.1}(SiO_4)_3O$ are shown in FIGS. 3 and 4. The uncorrected fluorescence spectrum (FIG. 3), from the above crystal shows in the near infrared including the 1.06 micron emission corresponding to the Nd laser line. In $CaY_{3.9}Nd_{0.1}(SiO_4)_3O$ this line is about ten times broader than in neodymium doped calcium fluorophosphate (50A vs. 6.5A). Hence our new silicate oxyapatite host, doped with neodymium should have enhanced energy-storage capabilities making it very promising for Q-switching laser applications. The visible and near infrared absorption spectrum (FIG. 4) for a single crystal of $CaY_{3.9}Nd_{0.1}(SiO_4)_3O$ indicates the considerable overlap of absorption bands to be found in this laser material. This suggests a relatively high average absorption of pump radiation. The relative intensity of the 1.06 micron line in its two polarizations ($I_\pi / I_\sigma$) for this sample was 1.4 and the decay time was 143 micro-seconds for the Nd emission.

Figure 5:
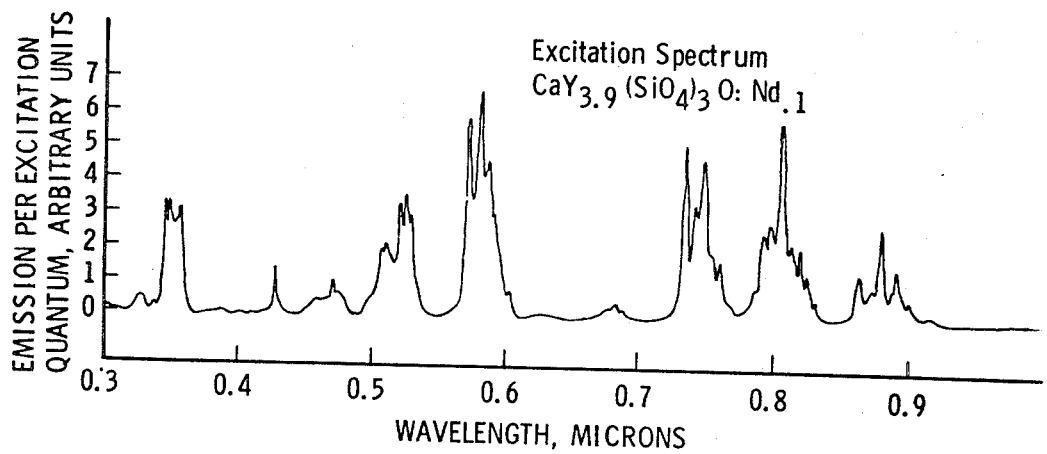
FIG. 5 shows the excitation spectrum of the infrared fluorescence from a polycrystalline sample of $CaY_{3.9}Nd_{0.14})_3O$.

The excitation spectrum (FIG. 5) of the 1.06 emission line shows that energy is transferred from the absorbing levels to the $^4F_{3/2}$ state, the initial laser level.

The melting point of neodymium doped $CaY_4(SiO_4)_3O$ is significantly higher than neodymium doped $Ca_5(PO_4)F$. We have measured the hardness of polycrystalline samples of these two materials and compare them in the following table:

| Material | Knoop Hardness (200 g. load) | Moh's Hardness |
|---|---|---|
| $Ca_5(PO_4)F$:Nd | 540 | 6 |
| $CaY_4(SiO_4)_3O$:Nd | 702 | 6.6 |

Thermal shock resistance of neodymium doped $CaY_4(SiO_4{}_3O$ is also high. All data indicate that $CaY_4(SiO_4{}_3O$:Nd should be superior to doped calcium fluorophosphate in resisting structural distortion and failure at high pump levels.

Absorption spectra was measured on a Cary Model 14 commercial spectrometer. The excitation and fluorescence spectrometer system consisted of two grating monochromators for dispersing the exciting light and the fluorescence light, along with associated optics, detectors, lamps and electronics. The source used was an Osram Type XBO-900, a high pressure xenon arc lamp which was operated from a DC supply having less than 1 percent ripple. Fluorescence measurements were made using a Jarrell-Ash monochromator. A 600 l/mm grating blazed at 4,000 A allowed excitation spectra to be taken from 2,500 to 10,000 A. The quantum detectors used RCA 7102 Photomultipliers cooled to liquid $N_2$ temperature.

We claim as our invention:

1. In a laser generator having a resonant laser cavity, a laser crystal within said resonant cavity and a radiation source supplying energy to the crystal, the improvement comprising a silicate oxyapatite laser crystal having the formula $CaY_4(SiO_4)_3O$, said crystal containing an activator ion selected from the group consisting of Nd and Er in the ion concentration range of 0.02 to 20 atom percent of the calcium and yttrium cations in the crystal.

2. The laser generator of claim 1 wherein the crystal contains the activator ion Nd in the ion concentration range of 0.02 to 6 atom percent.

3. The laser generator of claim 1 also containing a Q switching means.

4. In a laser generator having a resonant laser cavity, a laser crystal within said resonant cavity and a radiation source supplying energy to the crystal, the improvement comprising a silicate oxyapatite laser crystal having the empirical formula $CaY_4(SiO_4)_3O$:A, S, where A is the ion Nd, S is the sensitizer ion Mn, wherein A is present in the ion concentration range of 0.02 to 20 atom percent of the calcium and yttrium cations in the formula and S is present in the ion concentration range of 0 to 20 atom percent of the calcium and yttrium cations in the formula.

5. The laser generator of claim 4 wherein the ion concentration of S is 0 in the laser crystal.

6. The laser generator of claim 4 also containing a Q switching means.

7. In a laser generator having a resonant laser cavity, a laser crystal within said resonant cavity and a radiation source supplying energy to the crystal, the improvement comprising a silicate oxyapatite laser crystal having the empirical formula $CaY_{4-x-y}(SiO_4)_3O$:$A_x$, $S_y$, wherein A is the ion Er, S is the sensitizer ion Yb, $x$ has a value between 0.001 and 1 and $y$ has a value between 0 and $(4-x)$.

8. The laser generator of claim 7 also containing a Q switching means.

9. The laser generator of claim 7, wherein $y$ has a value between 0 to 1 and $x$ has a value between 0.001 and 0.30 in the laser crystal.

10. The laser generator of claim 9, wherein $y = 0$ in the laser crystal.

* * * * *